US008335432B1

(12) United States Patent
Darcie et al.

(10) Patent No.: US 8,335,432 B1
(45) Date of Patent: Dec. 18, 2012

(54) EXTENDED BROADBAND PASSIVE OPTICAL NETWORKS

(75) Inventors: Thomas E. Darcie, Victoria (CA); Neil Barakat, Victoria (CA)

(73) Assignee: UVic Industry Partnerships Inc., Victoria, BC (CA)

( * ) Notice: Subject to any disclaimer, the term of this patent is extended or adjusted under 35 U.S.C. 154(b) by 751 days.

(21) Appl. No.: 12/419,990

(22) Filed: Apr. 7, 2009

Related U.S. Application Data

(60) Provisional application No. 61/043,351, filed on Apr. 8, 2008.

(51) Int. Cl.
*H04J 14/00* (2006.01)
*H04B 10/00* (2006.01)
(52) U.S. Cl. ................................. 398/72; 398/58; 398/68
(58) Field of Classification Search ........................... None
See application file for complete search history.

(56) References Cited

U.S. PATENT DOCUMENTS

| 5,790,287 A * | 8/1998 | Darcie et al. ................. 398/108 |
| 7,499,651 B2 * | 3/2009 | Bouda et al. ..................... 398/71 |
| 2003/0106990 A1 * | 6/2003 | Tomofuji et al. ........ 250/214 LA |
| 2006/0104638 A1 * | 5/2006 | Chung et al. ..................... 398/71 |
| 2008/0013950 A1 * | 1/2008 | Boudreault et al. ............. 398/59 |
| 2008/0232807 A1 * | 9/2008 | Lee et al. ........................ 398/87 |
| 2010/0046945 A1 * | 2/2010 | Lee et al. ........................ 398/68 |
| 2010/0054740 A1 * | 3/2010 | Lee et al. ........................ 398/68 |

* cited by examiner

*Primary Examiner* — Kenneth N Vanderpuye
*Assistant Examiner* — Abbas H Alagheband
(74) *Attorney, Agent, or Firm* — Klarquist Sparkman, LLP (57) ABSTRACT

Optical networks interconnect a plurality of optical network units (ONUs) to an optical line terminal (OLT). The OLT comprises a plurality of optical transceivers that are wavelength division multiplexed and connected to a WDM metro network. The metro network is configured to facilitate communication of a plurality of wavelengths between the OLT and local nodes, the local nodes including a wavelength sharing network configured to connect at least one of the wavelengths communicated with the OLT to a plurality of feeder fibers. The feeder fibers connect the wavelength sharing network to remote nodes that comprise WDM devices that have pluralities of output ports. An optical combiner allows the first and second ONUs to share the same transceiver in the OLT.

10 Claims, 5 Drawing Sheets

EXTENDED BROADBAND PASSIVE OPTICAL NETWORKS

CROSS REFERENCE TO RELATED APPLICATION

This application claims the benefit of U.S. Provisional Patent Application No. 61/043,351, filed Apr. 8, 2008, and entitled "Extended Broadband Passive Optical Network," which is hereby incorporated herein by reference.

FIELD

The disclosed technology relates to a broadband access network based on a passive optical network (PON) that used wavelength division multiplexing (WDM). More specifically, the disclosed technology relates to a system and method wherein a given wavelength can be stared by multiple users, allowing efficient sharing of bandwidth and aggregation of local offices.

BACKGROUND

Broadband access networks have become the final frontier in the evolution of the broadband communications industry. While tremendous advances over the last two decades in optical-fiber networks provide enormous bandwidth (terabits per second per fiber) between all cities, emerging telecommunications services and Internet applications remain throttled by the access networks that connect end users to core networks. Widespread deployment of cable modem and digital-subscriber line access technologies has stimulated diverse bandwidth-hungry applications, demonstrating clearly the inevitable strong growth of bandwidth. But it is now accepted widely that these access technologies, built on the coaxial cable and copper wires of the past era, must soon yield to new optical-fiber-based access systems. Hence the rapidly growing fiber-to-the-x (FTTX) industry has emerged (where x=home, office, curb, etc.) providing tens of millions of optical access lines worldwide to date. Yet while major FTTX vendors and standards organizations compete, industry leaders are calling for the definition of optical access technologies that substantially outperform current FTTX systems in multiple dimensions.

Unlike core networks, where aggregated and smoothed traffic is exchanged between hundreds of end points, a set of unique challenges makes it rather difficult to introduce new technology into access networks. Access network infrastructure must connect to hundreds of millions of end points. Each end point may be inactive for extended periods of time and then demand high capacity in an instant. The cost of each access line must be justified by the revenue associated with an individual user. Given these constraints, cost is a primary concern and technology must be amortized over extended periods of time. Carriers therefore face difficult decisions in selecting access technology that cost-effectively meets demand and provides a reasonable upgrade path for future requirements.

First-generation (1G) broadband access systems, which include digital subscriber line (DSL) and cable modems (CM), use electronic signal processing to squeeze roughly 10 Mb/s downstream (to customer) and 1 Mb/s upstream out of existing metallic access wires (twisted pair for DSL and hybrid fiber coax (HFC) for CM). Ubiquitous deployment of these technologies has driven the Internet to prominence, and nears saturation in most info-tech (IT)-progressive countries. In recognition of the limits of these wires, the industry began in the 1990s to define a second generation (2G) of optical access technology targeting bandwidths of roughly 100 Mb/s. Passive optical networks (PONS) emerged as the dominant contending approach, and several varieties have been standardized (G-PON, E-PON). Commercial viability was achieved by sharing a single fiber channel by typically 32 or 64 customers. At present several tens of millions of PON-based lines have been deployed worldwide.

Given the enormous scale of the potential market for wireline access technologies (roughly $1000 per line×200 M lines in North America alone=$200 B), and the criticality of broadband communications for society, a large body of research and commercial activity continues, focused mostly on some form of PON. PONs were proposed concurrently in July 1986 by researchers at British Telecom (BT) in "Transparent single-mode fiber optical networks," Payne, D.; Stern, J.; Lightwave Technology, Journal of Volume 4, Issue 7, July 1986 Page(s):864-869, using WDM and, given that WDM was clearly impractical at that time, using subcarrier multiplexing to manage upstream contention on the shared fiber feeder, as in "Lightwave system using microwave subcarrier multiplexing," by Darcie, T. E.; Dixon, M. E.; Kasper, B. L.; Burrus, C. A.; Electronics Letters Volume 22, Issue 15, Jul. 17, 1986 Page(s): 774-775, and in "Wide-band lightwave distribution system using subcarrier multiplexing," by Darcie, T. E.; Iannone, P. P.; Kasper, B. L.; Talman, J. R.; Burrus, C. A., Jr.; Baker, T. A., Sr.; Lightwave Technology, Journal of Volume 7, Issue 6, June 1989 Page(s): 997-1005. BT then proposed using time-division multiplexing and a centrally coordinated medium-access control (MAC) protocol to manage contention, in "Passive optical local networks for telephony applications and beyond," by Stern, J. R.; Ballance, J. W.; Faulkner, D. W.; Hornung, S.; Payne, D. B.; Oakley, K.; Electronics Letters Volume 23, Issue 24, Nov. 19, 1987 Page (s): 1255-1256. This approach prevailed ultimately, and is the basis of the many existing PON standards, as described in "An introduction to PON technologies [Topics in Optical Communications]," by Effenberger, F.; Clearly, D.; Haran, O.; Kramer, G.; Ruo Ding Li; Oron, M.; Pfeiffer, T.; Communications Magazine, IEEE Volume 45, Issue 3, March 2007 Page(s): S17-S25.

Figure 1:
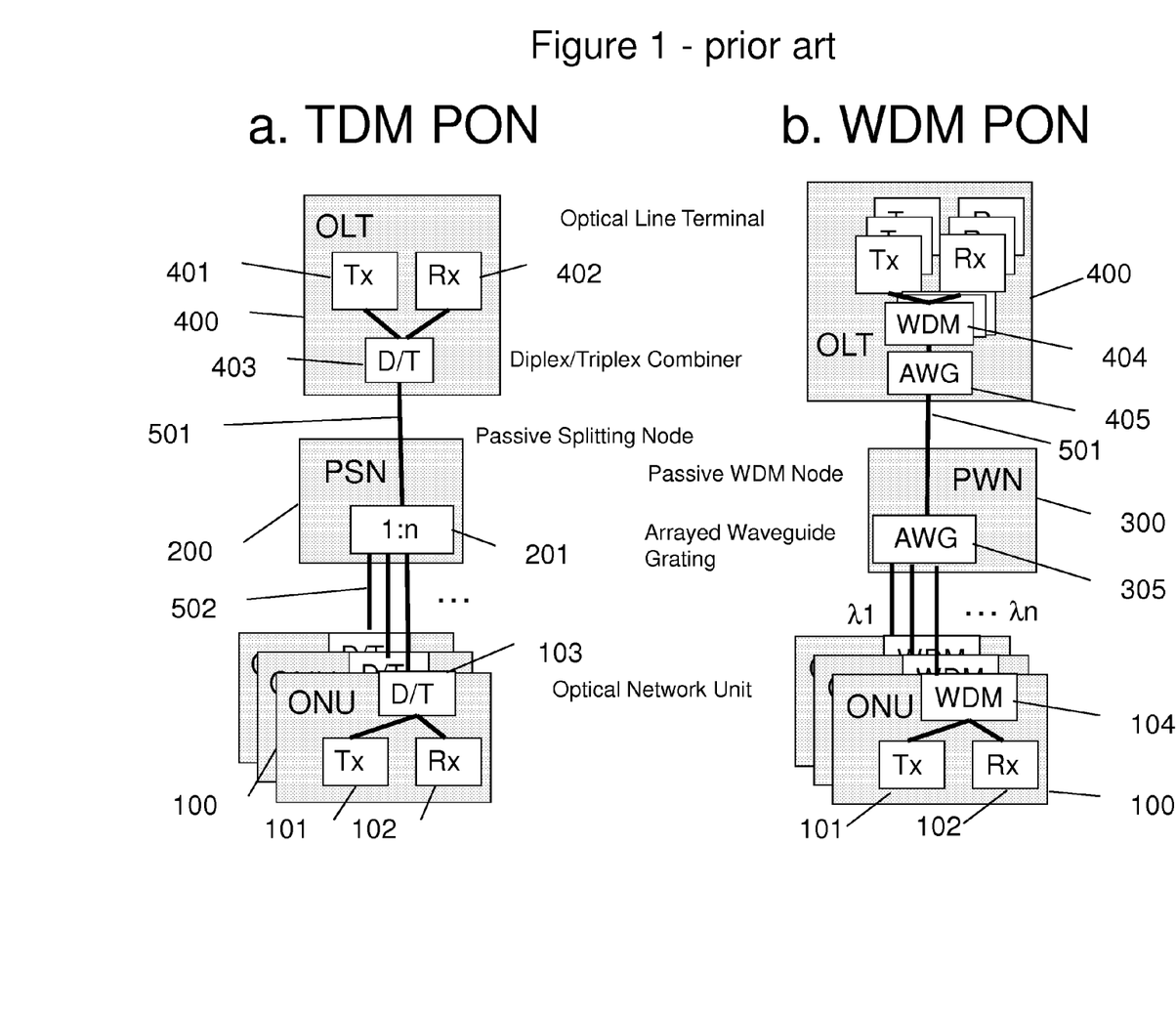
FIG. 1: Prior art, basic PON architectures with wavelength division multiplexing (right, b) or without (left, a). OLTs are in central office. Customers connect to ONUs.

The majority of current commercial activity focuses on the deployment of 2G PON FTTX systems. An example is shown in FIG. 1a. Downstream information is broadcast from the optical line terminal (OLT) 400 in the local office (LO), after separation from upstream information in a combiner 403, through a shared fiber feeder (~10 km) 501 to a neighborhood passive splitting node 200 (PSN) to 32-64 optical network units (ONU) 100 connected through fiber drop cables 502. Aggressive carriers prefer FTTH, where an ONU serves an individual customer. Conservative carriers place the ONU in a neighborhood, with short metallic, typically twisted pair 'drop' cables to each home (fiber-to-the-curb, FTTC).

Advantages of this form of PON over 1G DSL or CM systems include bandwidths of roughly 1 Gb/s shared by the 64 users, ease of fiber management in the LO, only one LO transmitter (Tx) 401 and receiver (Rx) 402 pair per PON, and no power required at the PSN. However, sharing through optical splitter 201 limits the bandwidth per user, the number of OLTs in a LO becomes an operational challenge, and for FTTC the large number of active (i.e. powered) ONUs in outside cabinets undermines that advantage of the passive network.

Continued growth of the Internet and the emergence of broadband applications like video on demand, IP-TV, peer-to-peer file sharing, and telecommuting, suggest that the bandwidth sharing used in 2G systems must be revisited. This has stimulated extensive research into third-generation (3G) systems. Industry consensus strongly favors PONs based on wavelength division multiplexing (W-PON), in which each user occupies a dedicated wavelength (rather than time slot, as in 2G) within a shared fiber feeder. With a full wavelength per user, logical point-to-point communication at multi-gigabit rates is feasible. However, W-PON faces well known challenges in cost, manageability, and scalability.

Numerous improvements have been suggested that are somewhat incremental on the basic 2G PON system, to avoid the challenges of W-PON. But the 3G research leading edge, which is gaining traction rapidly within industry, favors WDM-based PON (W-PON). Surprisingly, current proposals differ little from the first system proposed in 1986 in "Transparent single-mode fiber optical networks" Payne, D.; Stern, J.; Lightwave Technology, Journal of Volume 4, Issue 7, July 1986 Page(s):864-869, as shown in FIG. 1b. Wavelengths for each ONU Tx and Rx 101, 102 are combined in a WDM 104 in the ONU, and then combined at the passive wavelength node (PWN) 300 onto the feeder fiber 501 using an arrayed waveguide grating (AWG) 305. The inverse is implemented at OLT 400, providing full duplex connections between users and the network.

Numerous variants of this basic W-PON have been proposed. A key objective is to deploy a fiber infrastructure that is capable of supporting any future requirement, while being cost effective today. Proposals include overlays using spectral slicing to broadcast over a WDM network, as described in "Enhanced privacy in broadcast passive optical networks through the use of spectral slicing in waveguide grating routers," by P. P. Iannone; N. J. Frigo; K. C. Reichmann; Photonics Technology Letters, IEEE Volume 9, Issue 7, July 1997 Page(s): 1044-1046. In "An evaluation of architectures incorporating wavelength division multiplexing for broad-band fiber access," by Feldman, R. D.; Harstead, E. E.; Jiang, S.; Wood, T. H.; Zirngibl, M.; Lightwave Technology, Journal of Volume 16, Issue 9, September 1998 Page(s): 1546-1559, broadcast splitters and WDM are combined in the passive splitting node. A multistage W-PON is described in "Design and cost performance of the multistage WDM-PON access networks," by Maier, G.; Martinelli, M.; Pattavina, A.; Salvadori, E.; Lightwave Technology, Journal of Volume 18, Issue 2, February 2000 Page(s): 125-143. An interleaved W-PON is described in "A Novel Scalable Multistage DWDM PON Architecture Using Cascaded Optical Interleavers With Increasing Periodicities Controlled in Central Offices," by Akanbi, O.; Jianjun Yu; Ellinas, G.; Gee-Kung Chang; Conference on Optical Fiber Communication and the National Fiber Optic Engineers Conference, 2007. OFC/NFOEC 2007, 25-29 Mar. 2007 Page(s): 1-3. Hybrid time- and wavelength-division multiplexing is described in "A WDM-Ethernet hybrid passive optical network architecture," by Jeong-Ju Yoo; Hyun-Ho Yun; Tae-Yeon Kim; Kang-Bog Lee; Mahn-Yong Park; Byoung-Whi Kim; Bong-Tae Kim; Advanced Communication Technology, 2006. ICACT 2006. The 8th International Conference Volume 3, 20-22 Feb. 2006 Page(s): 4. In "A wavelength-division multiplexed passive optical network with cost-shared components," Frigo, N. J.; Iannone, P. P.; Magill, P. D.; Darcie, T. E.; Downs, M. M.; Desai, B. N.; Koren, U.; Koch, T. L.; Dragone, C.; Presby, H. M.; Bodeep, G. E.; Photonics Technology Letters, IEEE Volume 6, Issue 11, November 1994 Page(s): 1365-1367, the use of an optical loop back to eliminate wavelength control problems is described.

Implicit in PONs where wavelengths are shared is a medium-access control (MAC) protocol and associated scheduler. All 2G PONs use a centrally-mediated MAC protocol with reservations to organize upstream transmission. Efficient operation requires accurate determination of the transmission time to each ONU (ranging). Scheduling has been considered in a shared-wavelength W-PON, as described in "Design and performance analysis of scheduling algorithms for WDM-PON under SUCCESS-HPON architecture," Kyeong Soo Kim; Gutierrez, D.; Fu-Tai An; Kazovsky, L. G.; Lightwave Technology, Journal of Volume 23, Issue 11, November 2005 Page(s): 3716-3731.

To summarize the state-of-the-art, W-PON is seen as a likely end state, but challenges abound in reaching tolerable cost. These challenges can be classified roughly as follows. Architectural: Cost reduction requires optimization of topological design. Examples include minimizing total fiber spans, eliminating requirements for power and environmental control at network nodes, and efficient use of components through aggregation. Technology: Reducing component cost involves continuing the evolution of a defined technology towards lower cost. Wavelength-controlled lasers, WDM components, electronic drivers, and component packaging are examples. Operational: In determining the economic viability of access infrastructure over decades of use, the cost to maintain and operate the network is a main factor. For example, these costs include those associated with installation and removal driven by customer churn. State-of-the-art W-PON proposals have failed in one or more of these dimensions hence no consensus for a compelling direction has emerged.

With this invention we seek to overcome challenges with the prior art and define new systems for a next generation of future-proof all-optical access networks. These networks would become the infrastructure supporting future local wireline residential and business telecommunications. Our focus begins with the well-known concept of a passive optical network (PON) that provides a dedicated wavelength per user. A novel hierarchical wavelength multiplexing strategy, implemented in some embodiments using planar lightwave circuits defined herein, provides two key breakthroughs. First, while each PON provides a dedicated wavelength per user, this wavelength can be shared to a flexible degree with other users on other PONs. This allows introduction of tiered wavelength services. Second, it facilitates a distributed controller that mediates bandwidth on each shared wavelength such that the local office becomes simply a passive node, providing substantial operational advantages.

SUMMARY

In representative embodiments, optical networks for interconnecting a plurality of optical network units (ONUs) to an optical line terminal (OLT) are provided in which the OLT comprises a plurality of OLT wavelength division multiplexed (WDM) optical transceivers connected to a plurality of feeder fibers through a wavelength sharing network, and each ONU comprises an ONU wavelength division multiplexed (WDM) transceiver. A first of the plurality of feeder fibers connects the wavelength sharing network to a first remote node that comprises a first WDM device that has a first plurality of output ports, and a second of the plurality of feeder fibers connects the wavelength sharing network to a second remote node that comprises a second WDM device that has a second plurality of output ports. At least one of the first plurality of output ports is connected through a first drop fiber to an at least first ONU, and at least one of the said second plurality of output ports is connected through a second drop fiber to an at least second ONU. In addition, the wavelength sharing network comprises an optical combiner that allows the first and second ONUs share the same OLT WDM transceiver.

The foregoing and other objects, features, and advantages of the invention will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" means optically or electrically coupled or linked and does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved, that operation conform to any particular theory of operation. Networks, network components, systems, and sub-systems are disclosed as well as associated methods of operation. Description of any particular example is merely for convenient explanation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some disclosed representative examples, networks, network elements, components, or nodes are described in which each component or subsystem is configured in a similar manner. It will be appreciated that in other examples, one or more components or subsystems can be configured in a different manner, and examples in which each is similarly disposed are merely for convenient description. In addition, some examples may refer to certain features as corresponding to a minimum or a maximum. This is for convenient description only, and in other examples, networks, network elements, or methods are not associated with a minimum, maximum, or an optimal value.

In this set of inventions we provide a new path for W-PON that provides solutions to limitations of the prior art. Specifically, our approach retains the W-PON advantage of a shared fiber feeder, passive outside plant, and logical point-to-point connectivity with unlimited scalability in bandwidth for each user. But in addition, the approach includes a novel hierarchical wavelength-multiplexing strategy that enables tiered levels of wavelength sharing ranging from dedicated to highly shared wavelength per-user. It also incorporates well understood passive integrated optical planar circuit elements in novel configurations for remote nodes and in the local office. In one embodiment it uses a distributed medium access controller (D-MAC) that mediates bandwidth on each shared wavelength. This reduces system-wide operational cost by eliminating active local-office control functions such that the local office becomes simply a passive node. Finally, it enables the extension of the D-MAC across metro-scale distances to allow consolidation of many local offices (>10) into one master metro office. We describe a future-proof WDM fiber infrastructure with the ability to flexibly share wavelengths, and eliminate active control from the local office, relying on continued cost reduction of standard single-frequency lasers and passive optical elements. Our system simplifies operation in the LO while retaining passive outside plant.

Figure 2:
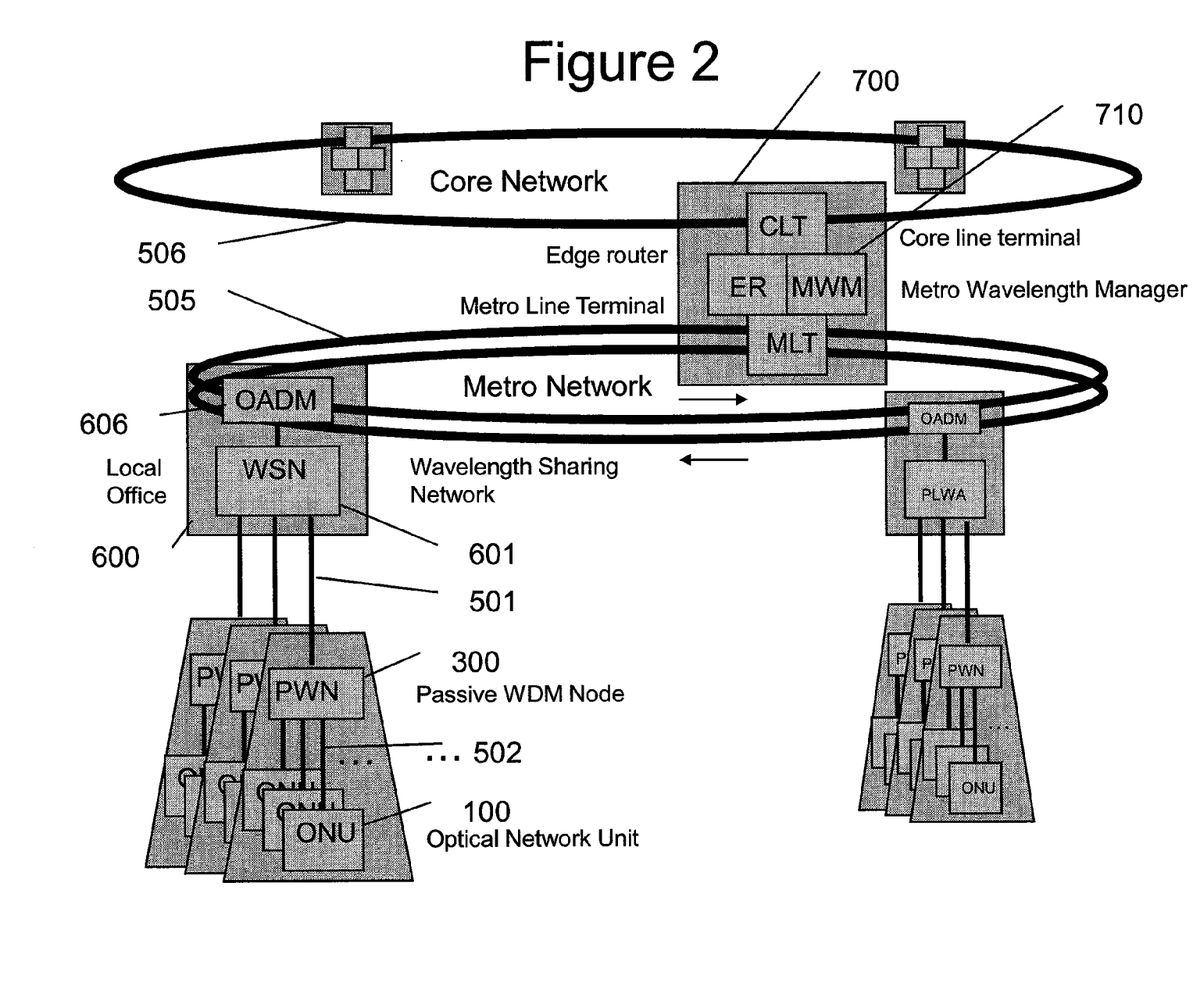
FIG. 2: Wide-area network based on proposed W-PON in accordance with the present technology.

A. Metro-Scale Architecture: This provides context for all aspects of the invention. As shown in FIG. 2, multiple PONs emanate from each local office 600, connected by fiber feeders 501. If each PON serves typically 32 users and each LO supports 10,000 subscribers, there are roughly 300 PON terminations in the LO. (This reduction in total number of fibers to be managed in the LO is a major factor driving the popularity of PON). In an embodiment of the proposed invention, the 300 OLTs that would be required with 2Gen PONs (400, FIG. 1) are replaced with one or more wavelength sharing networks (WSN) 601. These accept upstream communication from all users (ONU 100) and pass the information directly to the bidirectional metro-area ring 505 through a wavelength-selective optical add drop multiplexer (OADM) 606. Ideally, the local office would be passive (no electrical power). However, since wavelength configurability, optical amplification, and gain equalization may be required, this OADM node may not be strictly passive. It is however transparent to traffic from the metro ring and ONUs.

Figure 3:
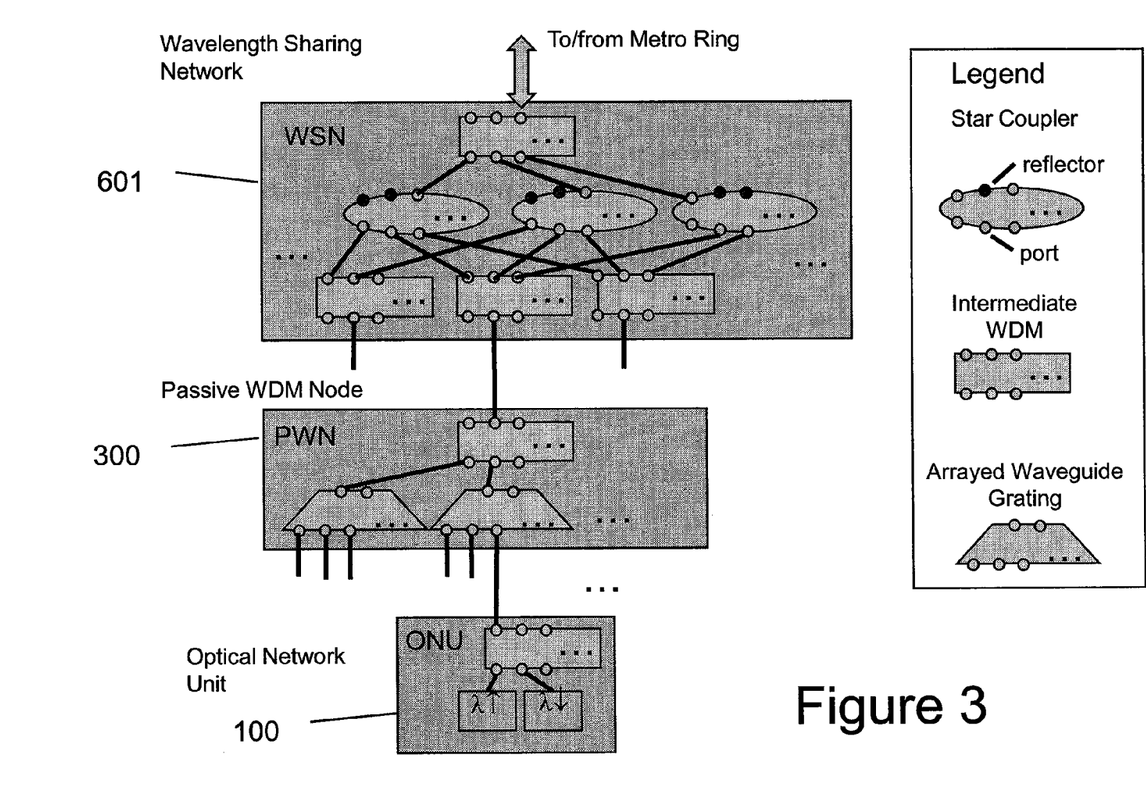
FIG. 3: Physical-layer PON design with optical circuit schematic based on three basic blocks in accordance with the present technology.

Key functions of the WSN, an example of which is shown in FIG. 3 and discussed later, include: 1) organizing traffic from each LO into the minimum number of efficiently utilized wavelengths required on the metro ring; and 2) facilitating the sharing of individual wavelengths by users on different W-PONs served by one LO. To accomplish these functions, the WSN combines upstream transmissions from each of the users (on different PONs in the same LO) sharing a wavelength. In one embodiment, it also reflects a fraction of the upstream transmission from each user on a given wavelength back to the other users sharing that wavelength, as discussed later. This reflected signal is used by the D-MAC protocol to manage contention. The WSN integrates standard passive photonic devices to implement complex functions in a compact and ultimately low-cost device. In another embodiment, transceivers are located in the LO and are shared through the WSN.

Figure 4:
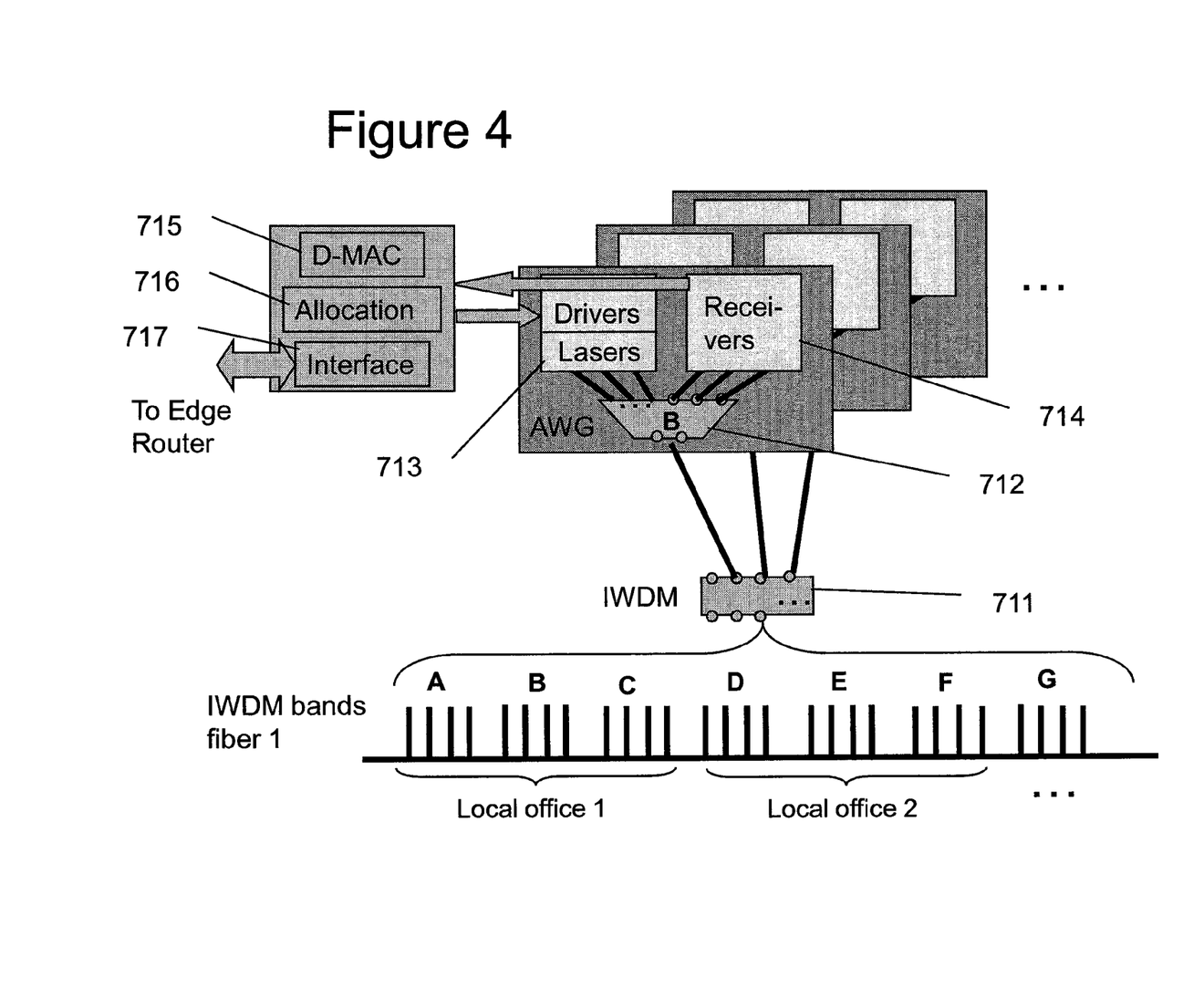
FIG. 4: Metro Wavelength Manager for proposed master metro node, in accordance with the present technology.

Multiple LOs 600 share the metro ring 505 (using different wavelengths or fibers), terminating at a metro line terminal (MLT) in the master metro office 700. This master office manages the well-organized traffic from all local offices and provides an interface to core networks 506, peering facilities, hosting, or any other service features. The metro wavelength manager (MWM), an example of which is shown in FIG. 4 and discussed later, controls all system functions including wavelength allocation, generating the timing clock that might be used by the D-MAC, and managing classes of service. It also originates (lasers) and terminates (receivers) transmission to/from users. Since D-MAC organizes user transmissions into shared wavelengths, the number of WDM transceivers is reduced. Required passive optical functions are similar to those in the WSN. In addition, the MWM, by concentrating complex functions at one location, presents the ideal opportunity for integration of active components (lasers and receivers) using recent developments in integration (e.g. Infinera) and silicon photonics (e.g. Intel, Luxtera).

A key objective is to consolidate functions from multiple LOs (those functions done for 2Gen systems in the 300 OLTs) into the master metro office. As has proven to be the case for the cable industry, a newly defined optical fiber physical layer that is free from the transmission constraints of copper wires may enable significant improvement in architectural and operational efficiencies through consolidating local offices. In simple terms, control functions of LOs, each supporting of order 10,000 users, are consolidated into at least 10× fewer master offices.

B. W-PON Physical-Layer Access System: FIG. 3 shows a representative embodiment of a WDM configuration that enables flexible sharing of individual wavelengths for the proposed W-PON. This uses a combination of dense WDM (DWDM) and intermediate WDM (IWDM). It is understood that there are many alternative configurations that could be described by one skilled in the art that can accomplish the intended wavelength sharing. First we review the well-known routing properties of an arrayed waveguide grating (AWG). For example, consider a set of evenly spaced wavelengths W1, W2, . . . and a particular 8 port AWG. If input wavelength 1 (W1) is applied to input port 1, and W2 to port 2, up to W8 on port 8, then all 8 wavelengths are combined into the same output port n. In addition, based on the 'cyclic' property, if W9 is applied to port 1, and W10 to port 2, and so on, these will also be combined onto output port n. We define the difference between W1 and W9 as the free-spectral range (FSR) of the AWG. A second important property is the 'port routing' property, by which if W1 is applied to input port 2, it will be output to port n+1.

Starting at the ONU 100, a 2-channel IWDM is used to separate upstream from downstream wavelengths. Both directions are multiplexed onto the single feeder fiber upstream from the PWN by separating the two wavelengths by the FSR of the AWG in the passive WDM node (PWN), using the cyclic property.

In this embodiment, the PWN uses a hierarchy of AWG and IWDM devices, where the bands multiplexed by the IWDM correspond loosely to each successive FSR (or multiple FSRs) of the AWG. Each AWG is identical, but users connecting to each different AWG use a different FSR, hence a unique wavelength. This combination of AWGs and IWDM is almost equivalent to a single larger AWG, but provides additional flexibility. The band of DWDM channels supported by each AWG can be placed optimally within the pass-band of the IWDM. (This becomes more important at the WSN.) More DWDM channels can be supported without the more challenging physical design of one large AWG. In another embodiment, the PWN consists of simply an AWG.

In the local office, a particular embodiment of the WSN 601 uses 3 stages. Starting from the upstream signal received at the WSN, the first IWDM stage separates each of the IWDM bands associated with each AWG in the PWN. Bands on the same IWDM channel from a number of different PONs are then combined in the second stage of passive star couplers. One of the output ports from each star coupler is sent to the third stage, an IWDM, from which the signal is passed to the OADM and to the master metro office. In one embodiment, the remaining output ports are terminated with high reflectivity such that exiting optical power is reflected back and distributed between all input ports. Reflected power then retraces the upstream path back to all users on the different PONs using the reflected frequency. The distributed MAC controller uses this signal.

In one embodiment, the metro wavelength manager (FIG. 2, 710) (MWM), an example of which is shown in FIG. 4, at the master metro office, bundles and unbundles multiple IWDM bands being delivered to and arriving from the many LOs sharing the metro ring. These are separated by IWDM 711 into bands A, B, C, etc., and each band is sent to an AWG demultiplexor 712 where it is separated into individual wavelengths representing transmitters 713 or receivers 714 for one (no sharing) or more (if shared) users. The MWM may also play a role in provisioning or assigning wavelengths to users through an allocation processor 717. This would receive provisioning instructions from a service provisioning element (not shown) that accounts for user levels of service, priorities, payment, etc. It may also play a roll in the implementation of D-MAC through controller 715. In particular, 715 may distribute a reference clock signal with the downstream transmission. Interface 717 provides a routing function to aggregate data flows to and from the many lasers and receivers into high-speed port connections on the edge router.

This architecture thereby provides users and service providers with a future-proof dedicated pair of wavelengths between ONU and local office, while allowing the service provider the ability to share each wavelength. Moreover, by varying the number of IWDM bands combined in the star coupler, the degree of sharing can be varied from one to approximately 32 (limited by physical-layer performance).

It is desirable in minimizing architectural and operational cost in 2Gen PONs to use only one drop and feeder fiber. We prefer not to argue with entrenched industry preferences, but recognize considerable benefit of a second fiber. The second fiber would, using the port routing property of the AWG, allow an additional layer of wavelength allocation. For example, upstream transmission could be in a separate fiber from downstream connected to a second port on the AWG, doubling the number of users supported on each PON. Networking benefits would include assisting D-MAC in reducing contention, accommodating user churn, and balancing load.

C. Distributed MAC protocol: Signals reflected back from the WSN (601, FIG. 3) to users on the same wavelength on other PONs on the same LO (the group) are used to mediate upstream transmission. Many variations can be considered for both D-MAC and physical-layer separation of data and control information, with varying degrees of complexity/performance. A D-MAC has been demonstrated in, for example, "Optical CSMA/CD media access scheme for Ethernet over passive optical network," by Chang-Joon Chae; Wong, E.; Tucker, R. S.; IEEE Photonics Technology Letters, Volume 14, Issue 5, May 2002 Page(s):711-713. Ideally, a high efficiency D-MAC approach needs to exchange information between group members and to schedule transmission based on that information. The simplest solution is the standard carrier-sense multiple-access with collision detection (CSMA-CD). Group members simply listen (exchange), and do not transmit if the line is occupied (schedule). This is fine for long packets and light load, but is inefficient if the packet durations are smaller than the round-trip propagation time between users and the WSN.

A better approach is to include a control channel that is shared by the group. One approach is to allocate a small percentage of time within a time frame for D-MAC. A master clock signal is transmitted from the master metro node by D-MAC element 715 (FIG. 4) through each LO to all users. Each user uses this and a ranging protocol (as in 2Gen PON) to establish an accurate timing reference for frame synchronization between contending users. Less than probably 32 users will be contending, and each user is able to exchange synchronized requests with all others. With data transmission at 10 Gb/s on each wavelength, a large volume of MAC information can be exchanged in a negligible percentage of time. We can therefore use a more robust reduced transmission rate of 1 Gb/s or less for control. An alternative is to use one of a number of orthogonal modulation formats for data and control channels. For example, DPSK has well known advantages for the data channel, and would allow overlay of an on-off-keyed control channel.

Each user schedules transmission into slots based on rules known to all N users and knowledge of user queues exchanged amongst the group. This should be efficient and fair. As a simple example, each frame is divided into N groups of time slots. Users with non-empty queues use sequential slots in each of the N groups. In the first group, user 1 is allocated the $1^{st}$ slot. Queues are then serviced in sequence until this group is full. In the $2^{nd}$ group, user 2 is allocated the $1^{st}$ slot, and so on. This is simple and fair, but many subtleties should be managed. Different size time slots should be used to handle short and long packets efficiently. Since the protocol should be executed in parallel by each user, it should be simple and computationally efficient.

D. Optical Circuit Design: Each of the elements shown in FIG. 3, and corresponding elements for the metro wavelength manager, can be manufactured in any of the contending planar optical technologies. AWG devices are manufactured by many vendors using either silica or silicon waveguide technologies. A likely circuit for the PWN would include 4 8-port AWG devices with close to identical design. Although the cyclic property allows each AWG to be identical, the design frequency might be varied to optimize performance with the IWDM filters.

The local office and metro wavelength manager are more challenging. The WSN uses well-known device blocks, including 4-port IWDM filters and 4- to 32-port star couplers, each of which can be implemented in planar waveguide technology. Thin-film IWDM filters will also be considered, as these may offer lower cost if they can be combined easily with the star couplers. Fiber couplers can also be used for the star couplers. A challenge arises in the scalability of the circuit design. The number of components required in each LO might exceed that which can be combined on a single integrated waveguide device with high yield. In this case it will be required to define a scalable means of interconnecting separate modules. In the MWM, similar scaling issues need to be addressed. In addition, the integration or passive and active devices is a natural fit with industry directions in III-IV integration (Infinera) and silicon photonics (Intel, Luxtera).

Figure 5:
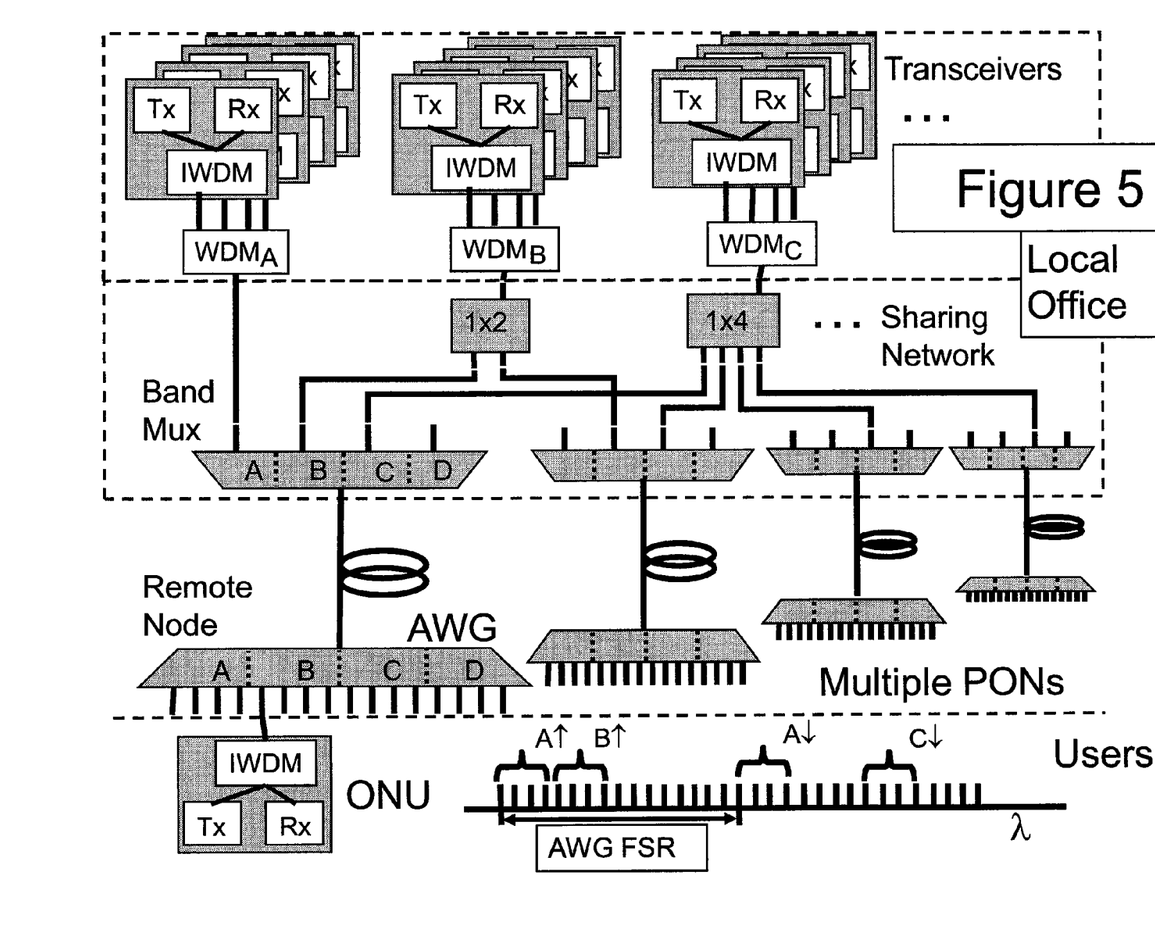
FIG. 5: Representative system architecture in which wavelengths associated with various transceivers (Tx, Rx) in the Local Office can be shared across multiple passive optical networks, in accordance with the present technology. IWDM are intermediate WDM devices that multiplex different free spectral ranges (FSR) of the arrayed waveguide grating (AWG).

E. Shared W-PON Without Local Office Consolidation: While consolidation of local offices is a worthy goal, the present invention is applicable without this. An example is shown in FIG. 5, which is similar to FIG. 2 but with the transceivers resident in the local office. Optical network units (ONU) use intermediate WDM (IWDM) to duplex upstream and downstream transmission. In this embodiment, a passive athermal AWG in the remote node, using its cyclic property, combines these on a single feeder fiber. If the AWG has N inputs and a corresponding free spectral range (FSR) of greater than or equal to N times the channel wavelength spacing, then an upstream wavelength λn on port n would be combined with downstream wavelength λn+FSR on the same port, as shown by the insert in FIG. 5. Wavelength-band demultiplexers in the LO separate traffic into multiple bands (E.g. A-D). Each band can be provisioned with a different level of wavelength sharing. Sharing of the transceivers in the LO is facilitated using passive splitters in the sharing network to combine bands from the same wavelengths on other PONs. For example, the ONU shown in FIG. 5 shares a wavelength with one other ONU by using a wavelength (periodic in FSR) assigned to the first port of the B band (λB1). This is routed to the 1×2 coupler in the sharing network where it shares λB1 with a user on a second PON. The λB1 transceiver is provisioned through a dense WDM (or another AWG) for the B band (WDMB).

Sharing requires also that a medium access control (MAC) protocol be implemented for each wavelength between the controller in the LO (not shown) and each ONU participating in sharing. This would function in a manner similar to existing PON standards, including ranging to coordinate timing, and a combination of contention and reservation to coordinate upstream transmission. Given the possibility a wide range of sharing degrees (e.g. 2-32), it may be advantageous to optimize the MAC for different sharing. It is also likely that a greater range of distances may be encountered than existing PONs in which sharing is confined to a single feeder. The MAC may need to reflect this increase.

Several factors limit the degree of sharing allowed. Increased sharing results in additional splitting loss in the sharing network. This becomes a factor when low-cost component are required and as bandwidths per wavelength increase to values like 2.5 or 10 Gbps. Impairment from fiber nonlinearity and component crosstalk are exacerbated by the increased loss budget. We have demonstrated experimentally that sharing between 16 users is feasible, and analysis indicates substantial increases can be realized with component optimization.

The foregoing is a description of several embodiments of the invention. As would be known to one skilled in the art, variations that do not vary the scope of the invention are contemplated. For example, users may use multi-wavelength transceivers to provide additional flexibility of wavelength assignment. The remote node may take on many configurations, including both wavelength-selective (E.g. WDM) and non-selective (E.g. passive splitter) elements. Optical amplification may be used to increase optical signal power at any point within the optical link. Additional optical splitters may be inserted between the remote node and a group of users, such that multiple users share each of the shared wavelengths output from the remote node.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An optical network for interconnecting a plurality of optical network units (ONUs) to an optical line terminal (OLT), in which the OLT comprises a plurality of OLT wavelength division multiplexed (WDM) optical transceivers connected to a plurality of feeder fibers through a wavelength sharing network, and each ONU comprises an ONU wavelength division multiplexed (WDM) transceiver, and in which
a first of the said plurality of feeder fibers connects the wavelength sharing network to a first remote node that comprises a first WDM device that has a first plurality of output ports,
a second of the said plurality of feeder fibers connects the wavelength sharing network to a second remote node that comprises a second WDM device that has a second plurality of output ports,
at least one of the said first plurality of output ports is connected through a first drop fiber to an at least first ONU,
at least one of the said second plurality of output ports is connected through a second drop fiber to an at least second ONU,
and in which the wavelength sharing network comprises an optical combiner that allows the first and second ONUs share the same OLT WDM transceiver operating at the same wavelength.

2. The optical network of claim 1 wherein the wavelength sharing network also comprises an arrayed waveguide grating (AWG) optical circuit.

3. The optical network of claim 1 wherein the first or second WDM device also comprises an AWG optical circuit.

4. The optical network of claim 3 wherein the ONU WDM transceiver comprises a laser transmitter transmitting at wavelength L1 and a wavelength-selective receiver selective to receive wavelength L2, such that L1-L2 corresponds to an integer multiple of the free spectral range of the AWG.

5. An optical network for interconnecting a plurality of optical network units (ONUs) to an optical line terminal (OLT), in which
the OLT comprises a plurality of optical transceivers that are wavelength division multiplexed and connected to a WDM metro network, said metro network configured to facilitate communication of a plurality of wavelengths between the OLT and a plurality of local nodes,
at least one of the said local nodes comprises a wavelength sharing network, configured to connect at least one of the wavelengths communicated with the OLT to a plurality of feeder fibers,
a first of the said plurality of feeder fibers connects the wavelength sharing network to a first remote node that comprises a first WDM device that has a first plurality of output ports,
a second of the said plurality of feeder fibers connects the wavelength sharing network to a second remote node that comprises a second WDM device that has a second plurality of output ports,
at least one of the said first plurality of output ports is connected through a first drop fiber to an at least first ONU,
at least one of the said second plurality of output ports is connected through a second drop fiber to an at least second ONU,
each ONU includes a wavelength division multiplexed (WDM) transceiver,
and in which the wavelength sharing network comprises an optical combiner that allows the first and second ONUs to share the same transceiver in the OLT operating at the same wavelength.

6. An optical network in accordance with claim 5 and in which said local node also comprises at least one optical amplifier configured to at least partially compensate for optical loss associated with said optical combiner and fiber transmission.

7. The optical network of claim 5 wherein the first and second WDM devices comprise arrayed waveguide grating (AWG) optical circuits.

8. An optical network for interconnecting a plurality of optical network units (ONUs) to an optical line terminal (OLT), in which
the OLT comprises a plurality of optical transceivers, each operable at a unique wavelength, that are wavelength division multiplexed and connected to a WDM metro network, said metro network configured to facilitate communication of a plurality of wavelengths between the OLT and a plurality of local nodes,
at least one of the said local nodes comprises a wavelength sharing network, configured to connect at least one of the wavelengths communicated with the OLT to a plurality of feeder fibers,
a first of the said plurality of feeder fibers connects the wavelength sharing network to a first remote node that comprises a first WDM device that has a first plurality of output ports,
a second of the said plurality of feeder fibers connects the wavelength sharing network to a second remote node that comprises a second WDM device that has a second plurality of output ports,
at least one of the said first plurality of output ports is connected through a first drop fiber to an at least first ONU,
at least one of the said second plurality of output ports is connected through a second drop fiber to an at least second ONU,
each of the first and second ONUs comprises a wavelength division multiplexed (WDM) transceiver for providing upstream and downstream communication on separate wavelengths, and distributed medium access controllers,
the wavelength sharing network comprising an optical combiner that allows the at least first and second ONUs to share the same transceiver in the OLT, and an optical reflector that allows each of the at least first and second ONUs to receive a portion of the others upstream transmission,
and in which the distributed medium access controllers in each of the at least first and second ONUs use the received portion of the others upstream transmission to coordinate upstream communication.

9. The optical network of claim 8 and in which said OLT generates a control signal, transmits this control signal to the at least first and second ONUs, and in which the ONUs use this control signal to coordinate upstream communication.

10. A method of operating an optical network interconnecting an optical line terminal (OLT) with a plurality of optical network units (ONUs) and in which the OLT comprises a plurality of optical transceivers connected to a plurality of feeder fibers through a wavelength sharing network, and each ONU comprises a wavelength division multiplexed (WDM) transceiver, said method comprising connecting a first of the said plurality of feeder fibers from the wavelength sharing network to a first remote node that comprises a first WDM device that has a first plurality of output ports, connecting a second of the said plurality of feeder fibers from the wavelength sharing network to a second remote node that comprises a second WDM device that has a second plurality of output ports, connecting at least one of the said first plurality of output ports through a first drop fiber to an at least first ONU, connecting at least one of the said second plurality of output ports through a second drop fiber to an at least second ONU, combining in an optical combiner within the wavelength sharing network the at least upstream transmissions from the at least first and at least second ONUs such that the first and second ONUs share the same transceiver in the OLT operating at the same wavelength.

* * * * *